June 25, 1963 R. G. GALINDO 3,094,782
METHOD AND APPARATUS FOR MEASURING TROUSER LENGTHS
Filed March 10, 1959 3 Sheets-Sheet 1

Ramón G. Galindo
INVENTOR.

BY *Hayden & Pravell*

ATTORNEYS

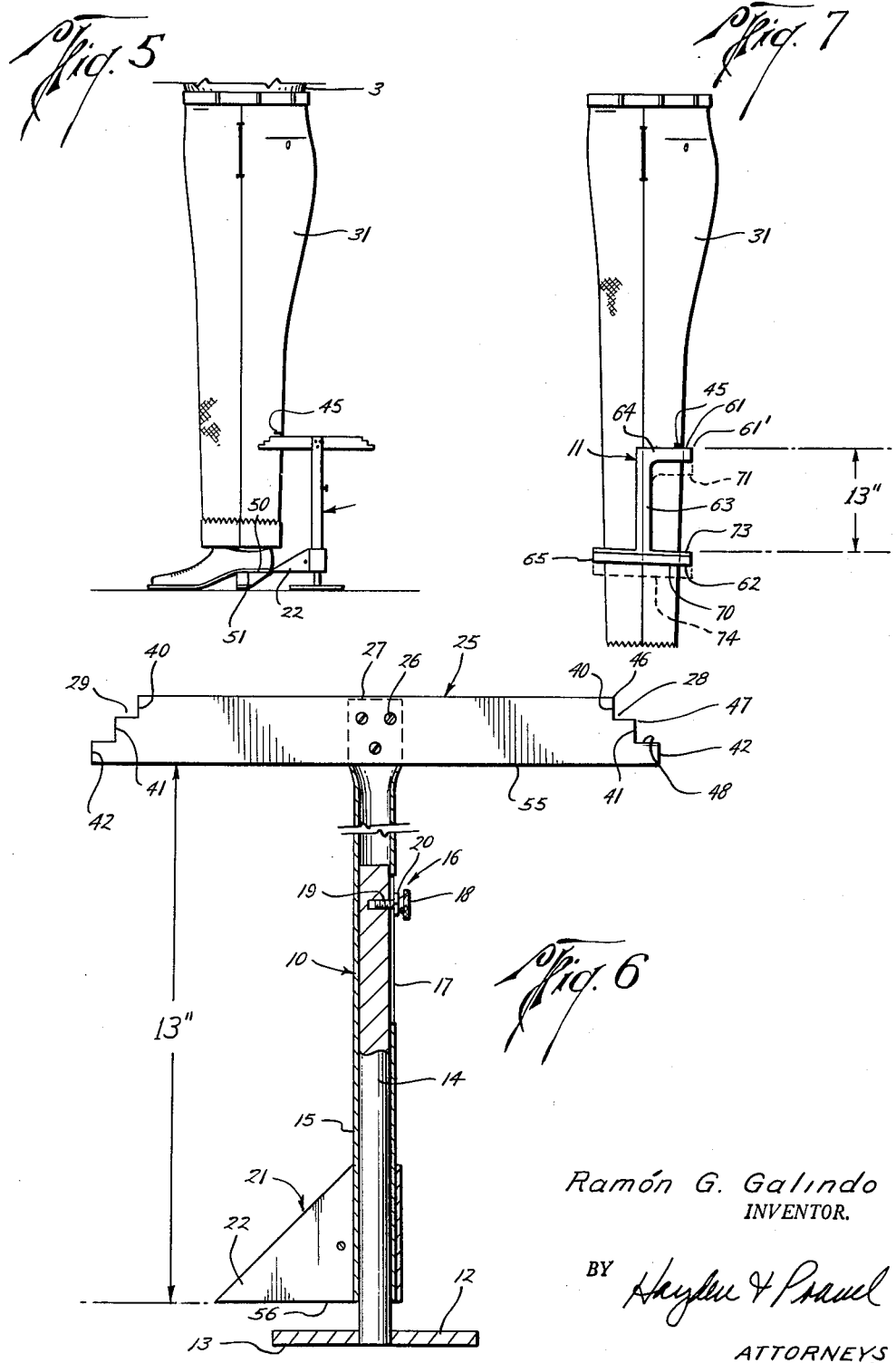

June 25, 1963     R. G. GALINDO     3,094,782
METHOD AND APPARATUS FOR MEASURING TROUSER LENGTHS
Filed March 10, 1959     3 Sheets-Sheet 3
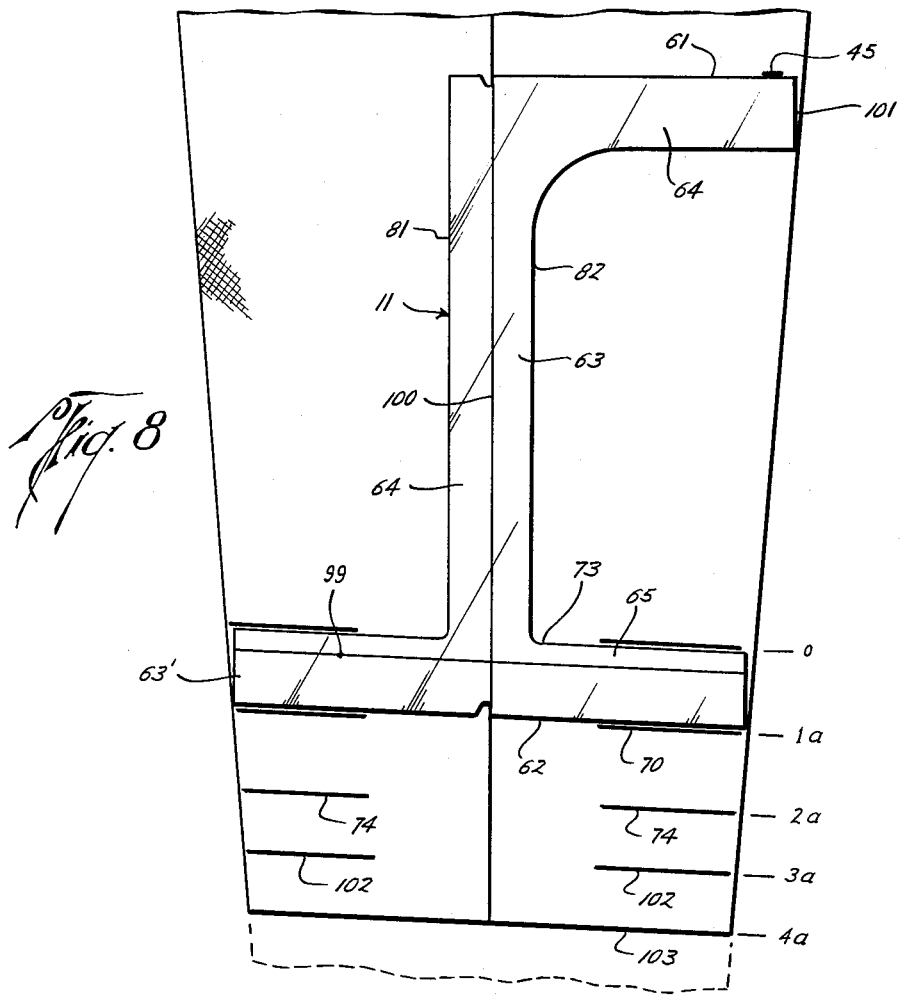
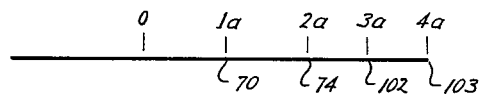
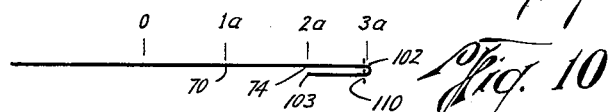
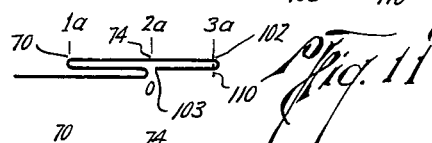
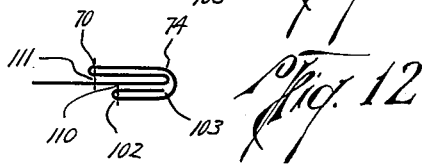
Ramón G. Galindo
INVENTOR.
BY *Hayden & Pravel*
ATTORNEYS United States Patent Office 3,094,782
Patented June 25, 1963

3,094,782
METHOD AND APPARATUS FOR MEASURING TROUSER LENGTHS
Ramón G. Galindo, 511 E. Riverside Drive, Austin, Tex.
Filed Mar. 10, 1959, Ser. No. 798,450
2 Claims. (Cl. 33—8)

The present invention relates to a method and apparatus for measuring the lengths of trousers to be worn by individuals, and more particularly to an improved form of apparatus and method of correctly measuring trouser lengths.

Various devices have been heretofore proposed for measuring the length of trousers to be worn by individuals. Most devices in use measure from a predetermined position or point on the body of the user downwardly towards the lower end of the leg. This is an extremely undesirable way in which to measure lengths, because it is not always convenient or desirable for the clerk who is measuring the trouser lengths to contact that portion of the body of the individual on whom the trousers are to be fitted.

Additionally, those methods which measure downwardly from some particular portion of the body of the individual, such as downwardly from the waist, or other body portions, do not take into account the fact that the shape and size of the individual upon which the trousers are being fitted sometimes causes wrinkles in the trousers, thereby making the measurement incorrect after the trousers have been removed from the individual and laid out for cutting.

The present invention overcomes these and other problems inherent in prior art devices and methods, in that it measures the length of the trousers without regard to the size or shape of the individual wearing the trousers being fitted. This is advantageous in that an accurate measurement may be obtained when the trousers are on the individual, which measurement will remain the same after the trousers have been removed from the individual, notwithstanding any wrinkles, bulges or other unnatural position of the material in the trousers, when the trousers are on the individual, which unnatural position may be caused by reason of the size or shape of the individual.

Still another object of the present invention is to provide a device for quickly and conveniently measuring trousers on an individual without the necessity of contacting any portion of the body of the individual.

Another object of the present invention is to provide a device for measuring trouser lengths, regardless of the type shoe or boot which the individual may be wearing.

Yet a further object of the present invention is to provide a device for measuring trouser length on an individual, whether the individual is wearing shoes or boots, and without regard to the type of shoe or boot being worn by the individual.

Yet a further object of the present invention is to provide a device for measuring trouser lengths on an individual, which device measures the trouser lengths from the lower end of the trousers upwardly, thereby obviating the problems and difficulties heretofore encountered with those devices wherein trouser lengths are measured downwardly from some position on or adjacent the body of the individual.

Another object of the present invention is to provide a novel method for measuring trouser lengths and the cuff arrangement on the trousers of an individual.

Still another object of the present invention is to provide a device for measuring the trouser lengths for an individual, regardless of wrinkles or other bulges which may be present in the trousers, and which measurement after being taken when the trousers are on position on the individual will remain the same when the trousers are laid out for cutting.

Other objects and advantages of the present invention will become more readily apparent from a consideration of the following description and drawings, wherein:

FIG. 3 illustrates the use of the invention in a situation where a special or built up shoe is worn on one foot by an individual;

FIG. 5 is a partial side view of an individual with the device of FIG. 4 moved from its normal use position for purposes of further illustration and clarification and showing its use with high-heeled boots;

FIG. 6 is an enlarged view, partly in section, of the preferred embodiment of the present invention;

FIG. 7 illustrates an additional part of the present invention used in conjunction with the apparatus shown in FIGS. 4, 5, and 6 for indicating and marking the final lengths of the trousers and the cuff arrangement thereon;

FIG. 8 is an enlarged view illustrating the steps in measuring the trouser length and cuff arrangement; and FIGS. 9–12 inclusive illustrate the stepwise folding and sewing on the trouser legs.

Figure 1:
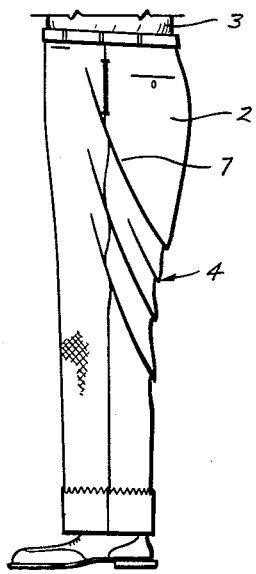
FIG. 1 is a partial side view of an individual showing trousers thereon and representing one form of wrinkle which is quite commonly found in trousers when they are fitted.
Figure 2:
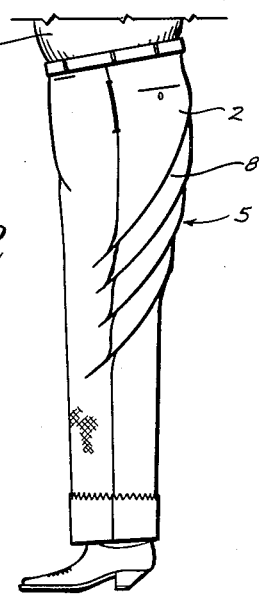
FIG. 2 is a partial side view of an individual with trousers, illustrating still another common type or arrangement of wrinkles found in trousers on individuals.

In FIG. 1 trousers are illustrated at 2 on an individual 3, and it is to be noted that the shape and size of the individual and the manner in which the trousers are supported on the individual, form a plurality of wrinkles in the area designated generally by the numeral 4 which extend across the vertical seam in the trouser legs as the trousers are being fitted. Similarly, in FIG. 2 the trousers 2 are shown on the individual 3, and the shape and size of the individual, as well as the manner in which the trousers are worn by the individual, cause an area of wrinkling designated generally by the numeral 5 as the trousers are fitted. In FIG. 1 it will be noted that the area 4 of wrinkles extends generally from about the knee of the individual 3 in a generally upward direction as illustrated by the numeral 7. On the other hand, in FIG. 2, the trousers 2 are worn by the individual 3 so that the area of wrinkles extends generally in a downward direction as represented at 8 and usually terminate at a point or position in the general area of the knees. With devices of the prior art which measure trouser lengths on individuals by being engaged on or adjacent some portion of the individual 3 and extend downwardly therefrom, do not take into consideration the area of wrinkles as represented at 4 in FIG. 1 and as represented at 5 in FIG. 2, so that after the trousers have been fitted for length and cuff arrangement, and then laid out on a table for cutting, it can be appreciated that the length of the trousers will vary from the original measurement taken when they were worn by the individual because the length of the trousers when wrinkled varies from the length of the trousers when laying flat on the table.

Figure 3:
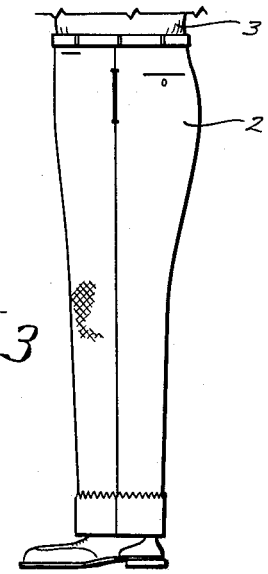
FIG. 3 is a side view similar to FIGS. 1 and 2 and illustrating a non wrinkle condition of the trousers, which is still another arrangement that the trousers may assume on an individual as they are being fitted.

FIG. 3 represents the normal position of trousers in an unwrinkled condition on the individual, the trousers being represented by the numeral 2 and the individual by the numeral 3. It will be noted that the trousers throughout their length are in an unwrinkled condition, and in this situation if the length of the trousers be measured from the waist, or from some other portion of the individual's body and downwardly therefrom, the length will be substantially correct; however, the situation arising as represented by FIG. 3 is rather uncommon in fitting trousers. Generally, when trousers are fitted on individuals there will be an area of wrinkling in one form or another, including those forms represented by way of example in FIGS. 1 and 2.

In order to obviate the problems of wrinkles in trousers at the time they are fitted, I have discovered that if the length of the trousers, and the cuff arrangement on the trousers, can be indicated on a non-wrinkled portion of the trousers, and if the length can be designated without regard to the manner in which the trousers are worn, then when the trousers are laid out on a table or the like for cutting, the length will not vary, because the length has been measured independently of any unwrinkling of the trousers. Additionally, I have discovered that it is desirable and it is possible, with the device of the present invention not only to eliminate problems heretofore encountered in measuring the lengths of trousers on various sized and shaped individuals, but it is also possible to measure the length of trousers on individuals regardless of the type shoe being worn on either foot and even if no shoe is worn.

Attention is directed to FIG. 6 of the drawings wherein the device of the present invention is represented generally by the numeral 10, and attention is also directed to FIG. 7 of the drawings where an additional part of the invention is represented generally by the numeral 11, the two being used together to practice the method of the present invention. It will be noted in FIG. 6 that the device represented generally by the numeral 10 is illustrated as comprising a base 12 which is constructed and arranged so that it may rest upon the floor or other surface during use. If desired, the base may be formed of metal so as to help retain the device in an upright position during use. However, it may be formed of any suitable material such as plastic or the like, and retained in position on the floor by a weighted object during use, if desired. The nether portion 13 of the base is preferably flat so that it will stand in an upright position, and secured to and extending upwardly from the base 12 is the vertically extending member represented by the numeral 14. The member 12 may be of any suitable configuration and is illustrated in the drawings as being cylindrical. A member 15 is slidably positioned on the vertical extending member 14 for movement relative to the member 14, and suitable means as indicated generally at 16 are provided, whereby the member 15 may be held in any desired elevated position relative to the member 14.

The member 15 is shown in the drawings as comprising a cylindrical member which telescopically fits the vertically extending member 14, but it can be appreciated that the construction and shape of the member 15 and its manner of arrangement on the member 14 may vary without departing from the scope of the invention. Generally speaking, it is desirable to provide a means which can be moved vertically for marking a predetermined position on the trouser length when the trousers are worn by an individual, all as will be more fully described hereinafter.

A longitudinally extending slot 17 is provided in the member 15, and the means 16 may assume the form of a screw 18 which is threadedly engaged in the hole 19 in the member 14. An abutment surface 20 is provided on the screw 18 so that when the screw is moved inwardly, it will engage each side of the slot 17 of the member 15, whereby the member 15 may be held in any suitable desired vertically extended position on the member 14.

Figure 4:
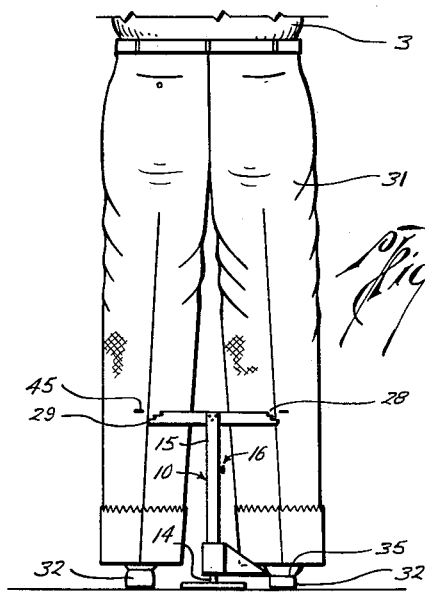
FIG. 4 illustrates the device of the present invention in use on an individual for measuring trouser lengths, wherein the individual is wearing high-heeled boots. Also.

Suitable means as illustrated generally at 21 are provided for indicating the position of the bottom of the heel of the individual as illustrated in FIGS. 4 and 5 of the invention. The means 21 may assume any general shape or configuration and as illustrated, it assumes a lateral projection 22 which is secured on the lower end of the member 15 by any suitable means (not shown) so that the means 21 moves with the member 15 as it is moved vertically along the upwardly extending member 14.

A cross arm designated generally by the numeral 25 is secured by any siutable means such as brads 26 or the like to the upper end 27 of the slidable member 15. The cross arm 25 is provided with mated step end portions 28 and 29 to indicate the particular arrangement of the cuffs on the trousers as desired by the individual, as will be more fully described hereinafter.

Attention is directed to FIG. 4 of the drawings, wherein the device 10 is illustrated. It will be noted that the individual 3 is illustrated as having the trousers 31 which are to be cut and cuffed, as desired. The individual 3 is wearing a built up heel on the left foot and an ordinary size heel on the right foot, represented by the numerals 32 and 32' respectively. Of course, the trousers 31 must be cut and fitted so that they will hang properly on the individual 3, whether he is wearing normal sized heeled shoes, high-heeled boots, or even shoes without heels, such as house shoes or the like.

In using the device 10, it is positioned at the rear and between the legs of the individual 3 as shown in FIG. 4 of the drawings. It will be noted that the vertically extending arm 14 is of a length so that it will terminate at a point or position about the middle of the calf of the individual 3, but always below the knee of the individual so as to avoid the normal wrinkling area of the trousers. The member 15 is somewhat longer as more clearly illustrated in FIG. 6 of the drawings so that it can slide freely relative to the member 14. It will be noted by referring to FIGS. 1 and 2, that the wrinkled area 4 and 5 respectively in each figure, terminates approximately at or above the level of the knee, and it is contemplated that the method and apparatus of the present invention measures the length of the trousers in the unwrinkled portion thereof from the knee downwardly.

To accomplish this, the projection 22 is positioned so that it engages at the top 35 of the heel of the normal height heel 32', which is in effect at the bottom of the heel of the foot of the individual. This movement raises the member 15 relative to the member 14, and these members may be held in their extended position relative to each other by the holding or lock means 16.

As previously indicated, the step end portions 28 and 29 of the cross arm 25 are used for positioning the cuffs on the trouser in a manner suitable to the individual 3. The step end portions are approximately three-eigths inch in length, as represented by the numerals 40, 41 and 42 on each end 28 and 29 respectively. If the wearer of the trousers 31 desires very little break in the crease in the trousers at the point where the trousers rest on the shoes or boots, then a mark as illustrated at 45 is made on the rear part of the trousers. This mark 45 represents the upper level 46 on the cross arm 25. The next level 47 on the cross arm is approximately three-eigths of an inch below the level indicated at 46, and, therefore, if the individual 3 desires what is termed a "one-half break" in the trousers, then the mark 45 would be positioned at the level 47 indicated in FIG. 6 of the drawings. Similarly, if the wearer 3 desires still a greater wrinkle in the crease at the point where the trousers abut the top of the shoe, then the mark 45 would be positioned at the level 48 of the cross arm 25. The above marking is accomplished after the slidable member 15 has been elevated by reason of positioning the projection 22 adjacent the heel as previously described herein. The means 16 then locks the member 15, and thereafter the mark 45 is made on each trouser leg either at the position 46, 47 or 48, depending upon whether the individual wearer of the trousers desired what is termed a "no break," a "one-half break," or a "full break," in the trousers.

In FIG. 5 the position of the device illustrated generally at 10 has been moved from its normal operating position to the side of the trouser leg in order that the manner of use of the present invention could be better illustrated. It will be noted that the projection 22 is constructed and arranged so that it can engage with the top of the heel adjacent the sole 51 of the boot or shoe. This, in effect, is positioning the lateral projection 22 at the bottom of the individual's heel on his foot. The mark 45 is made on the trousers in a manner as previously described with regard to FIG. 4 and thereafter the trousers 31 may be removed from the individual 3.

The device indicated at 11 now is used to mark off the trouser lengths and the cuff position on the trouser lengths. The length of the member 10 is related to the length of the the member 11; this length may vary, but it is short enough so that the measurements herein described are always taken on the cuff of the individual. For example, the length on the member 10 related to the length on member 11 may be thirteen inches and this length on the device 10 is measured from the lower edge 55 of the cross arm to the lower edge 56 of the projection 22 and is measured on the device 11 from the rear upper edge 61' to the top edge 73.

The member 11 may be formed out of a sheet of plastic or similar material and its preferred construction is better illustrated in FIG. 8 of the drawings. It can be formed by laying a template or model of the member 11 on a sheet of plastic so that the edge 101 is adjacent the edge of the sheet of plastic, and thereafter the body portion 63, the projection 64 and the base 65 are cut from the sheet of plastic. It will be noted that the lower edge 62 of the base 65 is cut at an angle so that the portion 63' of the base 65 which is adjacent the front of the trouser legs is somewhat elevated relative to the rear portion of the trouser legs. This results in the cuff, the making of which will be explained hereinafter, being slightly tapered down from the front of the trouser legs to the rear of the trouser legs which is usually preferred. The width of the base 65 is the same as the width of the cuff desired, and could be any width. Normally the cuff width is 1¾" therefore the base 65 would be made so as to be 1¾" wide. The length of the base 65 could be any desired length, but a length of about 12" is practical.

A reference line 100 extends from top to bottom of the vertical flat body portion 63 and a horizontal reference line 99 extends across the base 65. The reference line 100 can be located any place on the vertical member 63 and in fact, either edge 81 or 82 of the vertical body 63 could serve as the reference line 100. The reference line 100 is substantially perpendicular to the lower edge 62 of the base 65 and forms an angle slightly less than 90° with the lower edge 62 of the base 65 on the left side and forms an angle slightly more than 90° with the lower edge 62 of the base 65 on the right side. The horizontal reference line 99 extends edge to edge of the base 65 and is parallel to the lower edge 62 and the upper edge 73 of the base 65. The line 99 is located above the lower edge 62 any desired distance and indicates the location of the seam to be sewn on the cuff. In using the device 11 to indicate the trouser length at the point where the trousers are to be cut off, and to form the cuff thereon, it will be recalled that a length on the member 10 is related to a length on the member 11. This related length was not defined hereinabove.

In using the device 11 the projection 64 is placed as illustrated in FIGS. 7 and 8 so that the mark 45 on the trousers, which mark was previously obtained by placing the projection 22 at the top of the heel of the shoe of the party being fitted, is at the top edge of the lateral projection 64, which top or upper edge is designated by the numeral 61, and the reference line 100 is placed over the vertical seam on the trouser leg. Of course, the trousers at this time are laid flat on a table so that the measurements and markings obtained by using the device 11 as noted above, and as described in more detail hereinafter, may be quickly and easily made.

After the device 11 has been positioned so that the upper edge 61 of the projection 64 is adjacent the mark 45 on the rear portion of the trousers, a mark has been made along the line indicated by the numeral 70 in FIGS. 7 and 8 which is adjacent the lower edge 62 of the portion 65 of the device 11. The device 11 is thereafter moved down to the dotted line position as shown at 71 in FIG. 7 so that the line 70 then rests adjacent the top edge 73 of the portion 65 and a second line is made as indicated at 74 in FIGS. 7 and 8. The device 11 has been moved down a third time so that the mark 74 coincides with the reference line 99 and a third line as indicated at 102 is marked on each trouser leg along the lower edge 62 of the member 65.

Thereafter the device 11 is moved down again so that the reference line 99 coincides with the third mark 102 and the fourth line 103 is drawn on the trouser legs.

Thereafter the trousers are cut off along the line 103. The various positions one, two, three and four are indicated on each of FIGS. 7 and 8, as well as FIGS. 9, 10, 11 and 12. The first mark 70 is represented by the numeral 1a, the second mark 74 is represented by the numeral 2a, the third mark 102 is represented by the numeral 3a and the fourth mark 103 is represented by the numeral 4a. The first step in forming the cuffs on the trousers at the proper length is to fold that length of the trousers between the marks 102 and 103, which is that portion of the trouser leg between the position indicated at 3a and 4a in FIGS. 8–12, inclusive. This first step is represented in FIG. 10 and after this first fold has been made, a seam as illustrated at 110 may be sewn in each trouser leg. Thereafter, each trouser leg is folded upwardly from the point designated 0 in FIGS. 8–12, inclusive, between the point 0 and the point 1a which is the first mark 70. It now becomes apparent that the distance between 1a and 2a or between the marks 70 and 74 is the length of the cuff, and the final fold in the trousers is made as shown in FIG. 12 of the drawings where the final arrangement of the cuff on the trouser is illustrated.

It will be noted that in FIG. 11 the folding up of the trouser from the point 0, which is along the edge 73 of the member 65 is illustrated, and the next to last position of the trouser leg is presented. When the portion of the trouser leg between 2a and 3a, as well as that portion of the trouser leg between 102 and 103 is folded over and inside the trousers, the cuff may be tacked at 180° intervals around the leg as illustrated in dotted line at 111.

It can be seen from the foregoing description that the present invention provides an apparatus and method wherein the measurement of the trouser length and arrangement of the cuffs on the trousers is provided without any relationship to the wearer's body in that portion of the trousers where wrinkles occur most easily.

As also seen from the foregoing description, the invention can be used to measure the proper trouser length for an individual to be worn with any kind of shoes, regardless of which type of shoe is worn by the individual at the time the fitting is made. For example, the trousers can be fitted on cowboy boots, house shoes, ordinary shoes, or even if the person being fitted is barefooted, and thereafter the trousers may be worn with any other type of shoe. Also, the present invention provides a device for accurately measuring trouser lengths even where a person wears different types of shoes on each foot. In the latter situation, the measurement would be taken from the normal heel-height position, as opposed to the heel height of the special shoe and the measurement indicated by the normal heel-height then marked on both trouser legs. Thereafter, when the trousers are cut as described, the length of the trouser legs will be correct for the leg on which the normal shoe fits, as well as for the leg on which the special shoe fits to compensate for the physical defect.

The length of the device 11 is related to the member 15 of the device 10 so that after the device indicates the trouser length from heel height, as previously described, then the device 11 may be used to cut the trousers at the measured length.

For example, the present invention can be used to measure the trouser length even when the individual is wearing shoes of different heel height as noted above.

Also, the device 10 is constructed so that even in its most extended position, it reaches slightly below the knee level of any individual, so that the measurements may be taken in that portion of the trouser leg where no wrinkles occur.

It can be appreciated that the present invention provides an apparatus and method wherein trouser lengths are measured from the floor level up to the bottom of the heel of the foot of an individual, regardless of what type of shoes the individual may be wearing.

Broadly the invention relates to a device and method for measuring trouser lengths, and more particularly to an improved device and method for measuring trouser lengths on an individual, which permits the trousers to be measured without regard to the size of the individual, without regard to the type shoe, if any, being worn by the individual.

What is claimed is:

1. A device for indicating trouser length on an individual comprising a base, a vertically extending member secured thereto and extending upwardly therefrom, a member slidably positioned on said vertically extending member, indicator means carried by said member which is slidably positioned on said vertically extending member for indicating the shoe heel height of the individual being fitted whereby said slidable member may be adjusted vertically along said vertically extending member in relation to the heel height, means for holding said slidable member at the adjusted position on said vertically extending member, a cross arm at the upper end of said slidable member for marking the position of the upper end of said slidable member at the heel height of the individual, the lower edge of said cross arm being in fixed relationship to the lower edge of said indicator means, and additional means for measuring downwardly from the marking, said last named means being in relationship with the distance from the lower edge of said cross arm to the lower edge of said indicator means.

2. A device for marking cuffs on trousers on an individual comprising a base, a vertically extending member secured thereto and extending upwardly therefrom, a member slidably positioned on said vertically extending member, a lateral projection on said slidable member for engaging at the top of the heel of the individual whereby said last named member is moved upwardly relative to said vertically extending member, a cross arm on the upper end of said member for marking the desired cuff length on the trousers, the lower edge of said cross arm being in fixed relationship to the lower edge of said lateral projection, and means for measuring downwardly from the marking to indicate the length of the trousers, said last named means being a predetermined length, said length being equal in distance to the distance from the lower edge of said cross arm to the lower edge of said projection.

References Cited in the file of this patent

UNITED STATES PATENTS

| | | |
|---|---|---|
| 826,846 | Hall | July 24, 1906 |
| 1,783,906 | Dockstader | Dec. 2, 1930 |
| 2,122,068 | Meyers | June 28, 1938 |
| 2,677,889 | De Pew | May 11, 1954 |